United States Patent [19]

de Groot et al.

[11] Patent Number: 5,724,134
[45] Date of Patent: Mar. 3, 1998

[54] CALIBRATION STANDARD FOR OPTICAL GAP MEASURING TOOLS

[75] Inventors: Peter de Groot; James Biegen; Leslie Deck; Robert Smythe, all of Middletown, Conn.

[73] Assignee: Zygo Corporation, Middlefield, Conn.

[21] Appl. No.: 556,273

[22] Filed: Nov. 13, 1995

[51] Int. Cl.⁶ .............................. G01J 1/02; G01B 11/00; G01B 11/14
[52] U.S. Cl. ................ 356/243; 356/372; 356/373
[58] Field of Search .................... 356/243, 372, 356/376, 373, 375, 379, 128, 351, 353, 356, 358, 363, 357

[56] References Cited

U.S. PATENT DOCUMENTS

| | | | |
|---|---|---|---|
| 4,072,422 | 2/1978 | Tanaka et al. | 356/108 |
| 4,091,654 | 5/1978 | Hurtig et al. | 73/7 |
| 4,593,368 | 6/1986 | Fridge et al. | 356/525 |
| 4,681,451 | 7/1987 | Guerra | 356/373 |
| 5,105,408 | 4/1992 | Lee et al. | 369/44 |
| 5,218,424 | 6/1993 | Sommargren | 356/358 |
| 5,220,408 | 6/1993 | Mager | 356/372 |
| 5,280,340 | 1/1994 | Lacey | 356/357 |
| 5,410,402 | 4/1995 | Li et al. | 356/243 |
| 5,453,831 | 9/1995 | Li et al. | 356/243 |
| 5,463,609 | 10/1995 | Inagaki et al. | 369/112 |
| 5,504,731 | 4/1996 | Lee et al. | 369/112 |

OTHER PUBLICATIONS

*Tribology and Mechanics of Magnetic Storage Devices*, by B. Bushan, pp. 765–797 (New York: Springer–Verlag, 1990) (no month available).

"Interferometric measurement of disk/slider spacing: the effect of phase shift on reflection", by C. Lacey, R. Shelor, A. J. Cormier and R.E. Talke. vol. 29, No. 6, Nov. 1993, *IEEE Transactions on Magnetics*.

Primary Examiner—Frank G. Font
Assistant Examiner—Michael P. Stafira
Attorney, Agent, or Firm—Francis J. Caufield

[57] ABSTRACT

Apparatus and means for calibrating optical gap-measuring instruments, including a preferred calibration standard (100) comprised of a substantially flat, transparent element (10) held in contact with the convex spherical surface (25) of a substantially opaque element (20) to provide an obvious and unambiguous region over which the gap is zero. The optical gap measuring tool that is to be calibrated is oriented so as to illuminate the interface. The calibration standard (100) is translated in position with respect the gap measuring tool in such a way as to vary the measured gap, while at the same time data storage means record the gap measurement as a function of relative position. This data is then compared to the predicted variation from the geometry of the calibration standard (100). Provided that the elements (10, 20) are of high optical quality, deviations of the measured data from an ideal parabolic curve are indicative of calibration errors.

12 Claims, 5 Drawing Sheets

CALIBRATION STANDARD FOR OPTICAL GAP MEASURING TOOLS

FIELD OF THE INVENTION

The invention relates to optical instruments for measuring distances, gaps and profiles. In particular, the invention teaches methods and means for calibrating such instruments.

BACKGROUND AND PRIOR ART

A frequently-encountered metrology task is the precise measurement of small gaps between the surfaces of two objects. In many of these tasks, one or both of the objects is fabricated from a substantially transparent material such as glass or the like, thus permitting access to the gap for optical inspection. An instrument which performs such a measurement will be referred to herein as an optical gap measuring tool. In magnetic data storage systems, for example, it is required to measure the flying height of a slider assembly near contact on a rapidly rotating rigid disk in order to verify the performance of the slider assembly. The optical gap measuring tool in this case is commonly referred to as a flying-height sensor. In flying height sensors, a partially transparent surrogate disk replaces the magnetic hard disk and the interference effects caused by the combined reflections from the disk and the slider surface provide the flying height information. Various known forms of flying height sensor are described in the book *Tribology and Mechanics of Magnetic Storage Devices*, by B. Bhushan, pp. 765–797 (New York: Springer-Verlag, 1990). Further examples of optical flying height sensors are found in U.S. Pat. No. 4,593,368 to D. A. Fridge, et al., U.S. Pat. No. 5,280,340 to C. Lacey and U.S. Pat. No. 5,218,424 to G. Sommargren. Additional examples are taught in my co-pending patent applications entitled Optical Gap Measuring Apparatus and Method bearing U.S. Ser. No. 08/408,907 filed Mar. 22, 1995, and now U.S. Pat. No. 5,557,399 issued on Sep. 17, 1996 and Interferometer and Method for Measuring the Distance of an Object Surface with Respect to the Surface of a Rotating Disk, bearing U.S. Ser. No. 08/381,232, filed Jan. 31, 1995 and Optical Gap Measuring Apparatus and Method, bearing U.S. Ser. No. 08/522,570 filed Sep. 1, 1995.

A fundamental difficulty in optical gap measurement is calibration. The term "calibration", as used herein, refers to a procedure which either verifies the accuracy of the instrument, or alternatively provides correction data from which accurate measurements may be inferred. Most often, the calibration standard must include a range of gaps consistent with the operational range of the optical gap measuring tool. Flying height sensors, for example, must be calibrated over a range of approximately one micron (40 µinch). The accuracy of the calibration standard must be substantially better than the specified accuracy of the flying height sensor, which is typically better than 5 nm. A further requirement is an accurate characterization of the optical properties of the materials that comprise the calibration standard, including in particular the effective index of refraction of the reflecting surfaces.

A representative prior-art calibration apparatus and method for flying height sensors is taught in U.S. Pat. Nos. 5,453,831 and 5,410,402, both issued to Y. Li, P. R. Goglia and C. C. Zahn. The prior-art calibration standard described by Li et al. includes a wedge slider held in contact with a glass disc by a load bridge, load spring and cover case. The wedge slider has a first rail and a second rail extending along its length and has a raised end to form an optical wedge between the glass disc and the first and second rails. The calibration procedure consists of measuring the gap formed between the glass disc and the wedge slider as a function of lateral position.

The calibration standard and procedure described in the above patents to Li et al. suffers from several disadvantages that are common to all methods involving a complex, manufactured device such as the proposed wedge slider. The manufacturing technique proposed in those patents by Li et al. is thin-film deposition, which although known in the art, is an expensive and highly specialized technique that may result in form and material irregularities. Thus, this prior-art calibration standard must therefore be carefully characterized in advance using independent profilometry of the separate components. In addition, thin-film deposition may not be a suitable fabrication technique for all materials of interest. Still another difficulty in the prior art is the determination of the exact lateral position of the measurement spot, which is partially resolved in the wedge-slider technique by additional complications to the wedge slider design, including the introduction of cylindrical reference features to one of the slider rails. A further disadvantage of prior-art calibration standards is that there is insufficient information about the performance of the flying height sensor for very small gaps.

Still a further disadvantage of prior-art methods of calibrating optical gap measuring tools is the effect of phase change on reflection. This difficulty is described in an article entitled "Interferometric measurement of disk/slider spacing: the effect of phase shift on reflection", by C. Lacey, R. Shelor, A. J. Cormier and R. E. Talke. This article describes that the optical properties of slider materials can introduce errors as large as 20 nm in flying height sensors. These same problems apply to calibration standards. To correct for these potential errors, the calibration standard must itself be carefully characterized for phase change on reflection, using ellipsometric techniques. For example, U.S. Pat. Nos. 5,453,831 and 5,410,402 recommend fabricating a separate block of the same material as that of the wedge slider calibration standard. This piece of material is assumed to have the same optical properties as the wedge slider and may be used to determine the phase change on reflection using an ellipsometer or like optical instrument. However, this separate metrology complicates the use of prior-art calibration standards and introduces uncertainties in the calibration.

There is therefore an unmet need for an apparatus and method for high precision calibration of small gaps, such as is required for optical flying-height sensors and like optical instruments.

SUMMARY OF THE INVENTION

In a presently preferred embodiment of the present invention calibration standard for optical gap measuring tools, the apparatus is comprised principally of two elements. One or both of the elements is fabricated from a substantially transparent material such as glass or the like, thus permitting access to the gap for optical inspection. One of the surfaces of the first of these elements is substantially flat or planar, and one of the surfaces of the second element is non-planar or curved. The curved surface is preferably convex spherical in form. The two principle elements of the apparatus of the present invention are held together in such a way that the curved surface of the second element is substantially in contact with the flat surface of the first element. Since a curved surface and a flat surface cannot be entirely in contact over the entire area of either one of the two surfaces, the region of contact is typically substantially smaller in area than either of the two surfaces. However, physical effects tend to bring the two surfaces into intimate contact, thus establishing an obvious and unambiguous region of contact for which the gap size is known to be zero with great accuracy. Outside the region of contact, the gap between the surfaces varies according to the known geometric curvature of the surface on the second element.

In a presently preferred method of the invention, the optical gap measuring tool that we wish to calibrate is oriented so as to illuminate the inventive calibration standard. The calibration standard is translated in position with respect to the gap measuring tool in such a way as to vary the measured gap, while at the same time data storage means record the gap measurement as a function of relative position. This data is then compared to the values predicted from geometrical analysis of a gap between a curved and planar surface in contact. Preferably, this analysis comprises fitting a predicted functional variation of the gap to the calibration data, excluding the well-defined contact region. The difference between the data and the prediction is the calibration error. The analysis preferably includes the additional step of characterizing the performance of the optical gap measuring tool within the contact region, which is of particular interest when calibrating optical flying height sensors. Within the contact region, the physical gap is substantially equal to zero, so that the measured gap size within the contact region is a direct indication of the measurement error for small gaps.

The presently preferred calibration standard used in conjunction with an optical gap measuring tool additionally provides a method and means for determining the material phase change on reflection for a variety of materials. In a presently preferred method of the present invention, in a first step, an optical gap measuring instrument is calibrated using an embodiment of the inventive calibration standard in which the two principle elements have well known optical properties. In a next step, the same optical gap measuring tool measures the gap profile of an embodiment of the inventive calibration standard in which the one of the principle elements is a test object made of a material whose phase change on reflection is unknown. The test object may be any solid material, or alternatively a solid substrate coated with a layer of the test material. Since the contact region of the inventive calibration standard provides a clear and unambiguous zero-gap reference, any observed phase change detected within the contact region is equal to the material phase change on reflection for the test object.

BRIEF DESCRIPTION OF THE DRAWINGS

In the drawings, wherein like reference characters denote similar elements throughout the several views.

DETAILED DESCRIPTION OF THE INVENTION

Figure 1:
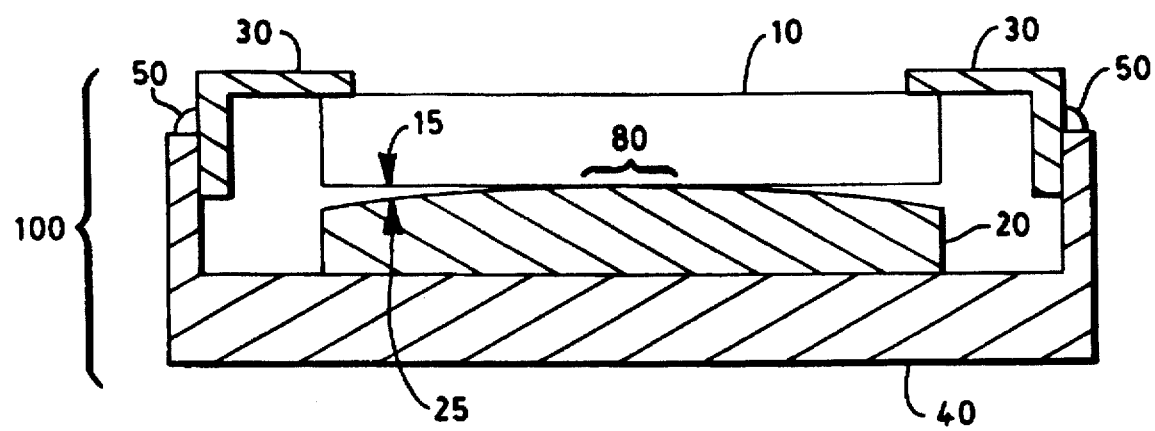
FIG. 1 is a drawing depicting a cross section of a preferred embodiment of the inventive calibration standard of the present invention.

Referring now to FIG. 1, there is shown the cross-section of a presently-preferred embodiment of the calibration standard of the present invention for optical gap measuring tools. The apparatus 100 comprises a substantially transparent first element 10 having a substantially flat surface 15 in contact with a convex spherical surface 25 of a second element 20. Elements 10 and 20 are maintained in their positions by an upper shell 30 and a lower shell 40, which may be made of metal, plastic or glass. Shell 30 fits tightly inside shell 40, thus protecting surfaces 15 and 25 from external sources of dirt and dust. Shells 30 and 40 are held together by an adhesive material 50. Those skilled in the art will appreciate that alternative mechanical means of maintaining elements 10 and 20 in position while protecting them from the external environment are possible without departing from the spirit and scope of the present invention.

Referring again to FIG. 1, there is shown a region of contact 80. Geometrically the region of contact is a single point. Physically, however, the contact region is substantially circular and extends over an area determined by the radius of curvature of surface 25, the mechanical force applied by shells 30 and 40, and other physical effects that tend to bring surfaces 15 and 25 into contact and enlarge the contact region. These effects are generally advantageous to the function of the apparatus as a calibration standard, since they serve to establish an obvious and unambiguous region over which the gap is zero.

Figure 2:
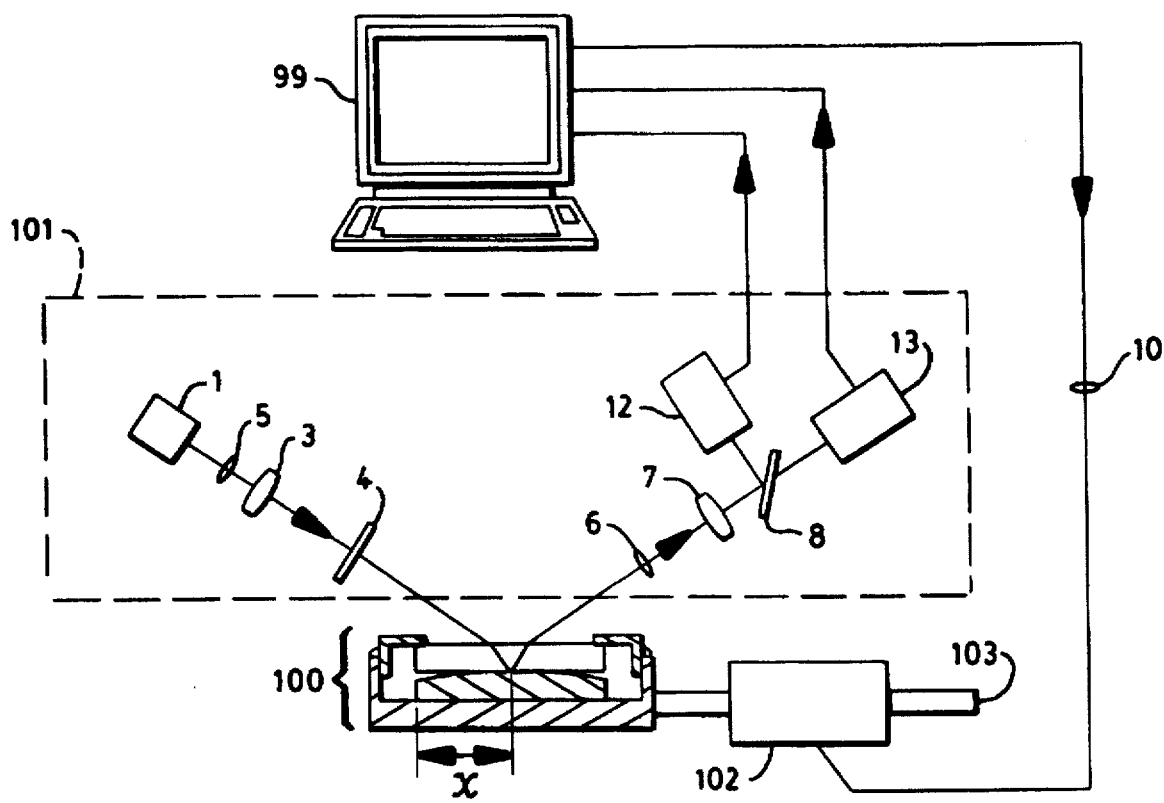
FIG. 2 is a drawing depicting the presently preferred apparatus of FIG. 1 together with such auxiliary equipment as would be appropriate when calibrating a known form of optical gap measuring tool.

Referring now to FIG. 2, the calibration standard of the present invention is shown with such auxiliary equipment as is appropriate for performing a calibration. The equipment preferably comprises an optical gap measuring tool 101 of the type disclosed in my co-pending patent application entitled "Optical Gap Measuring Apparatus and Method" filed Mar. 22, 1995 and bearing U.S. Ser. No. 08/408,907, and now U.S. Pat. No. 5,557,399 issued on Sep. 17, 1996. Laser source 1 emits a beam 5 which is focused by a lens 3 and polarized by a linear polarizer 4. Beam 5 measures calibration standard 100 at a lateral position x. In a next step, a reflected beam 6 is imaged by a lens 7 and is divided into two beams by a beamsplitter 8. An interference phase detector 13 and an intensity detector 12 send information to a conventional computer 99 which conventionally calculates the gap size z for the lateral position x. Further details relative to the function of optical gap measuring tool 101 are taught in the aforementioned U.S. patent application Ser. No. 08/408907 and now U.S. Pat. No. 5,557,399 issued on Sep. 17, 1996, the contents of which are specifically incorporated by reference herein. For the purpose of calibrating optical gap measuring tool 101, a linear translator 102 displaces calibration standard 100 by means of a support arm 103. The lateral position x is controlled by the computer 99 through a cable 104.

Figure 3A:
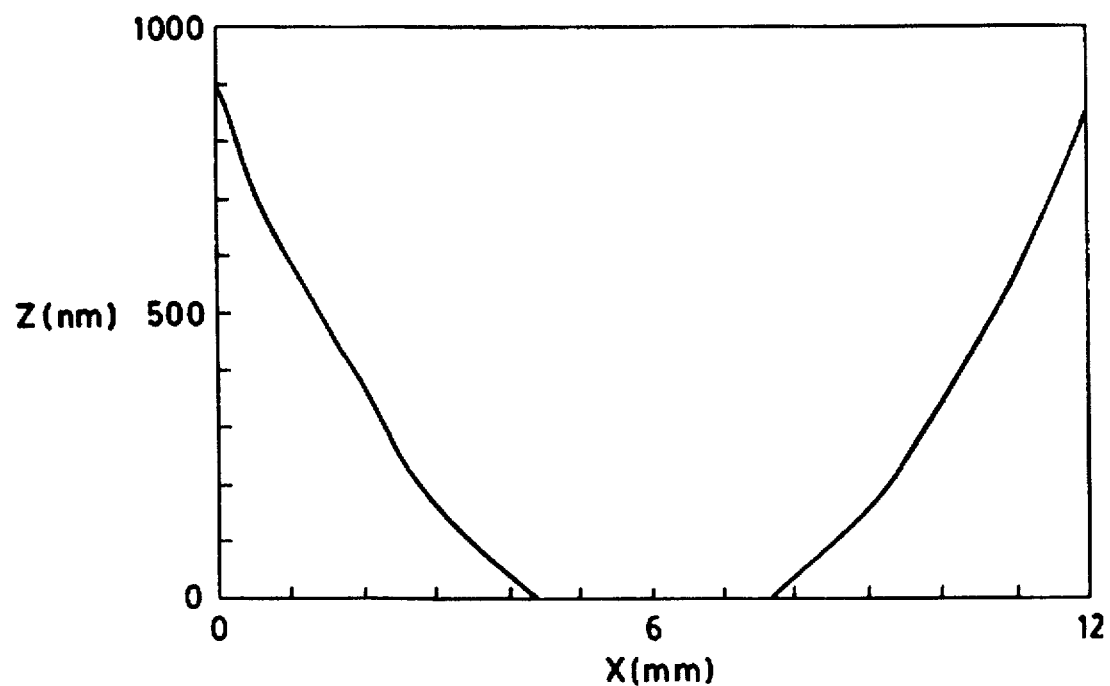
FIG. 3A is a graph showing typical calibration data in the form of gap size (ordinate or z value) as a function of lateral position (abscissa or x value)

The graph in FIG. 3A shows the results of a calibration scan using substantially equivalent apparatus to that shown in FIG. 2. The data clearly shows a region of contact between the lateral positions of 4 mm and 8 mm, approximately. In this region, the gap size z is substantially equal to zero. Outside this region, the data shows an approximately parabolic variation in gap size as a function of lateral position. This relationship may be expressed mathematically by the formula $$z = -\frac{x^2}{2R}$$

where R is a constant. Referring now to FIG. 1, elementary geometric analysis demonstrates that R is substantially equal to the radius of curvature of surface 25. Provided that elements 10 and 20 are of high optical quality, deviations of the measured data from the ideal parabolic curve are indicative of calibration errors. The presently-preferred data processing method consists therefore in fitting an ideal parabolic curve to those portions of the data that are outside of the contact region. The difference between this ideal curve and the data is the calibration error of the instrument, which may subsequently be used to verify the accuracy of the instrument or provide correction data.

Those skilled in the art will appreciate that the requirement of high optical quality is readily achieved for elements 10 and 20 shown in FIG. 1, since surface 25 has a particularly simple and common spherical form, such as is used for lenses and mirrors. Similarly, the flat or plano surface 15 of element 10 is also particularly common and easily made using standard grinding and polishing procedures known in the art. It will also be appreciated that the interpretation of the calibration data shown in FIG. 3A according to the presently-preferred data processing method has the significant advantage that the variable x need only be a relative measure rather than an absolute measure of lateral position. For example, the addition of an arbitrary offset of $x_0$ to the abscissa x shown in FIG. 3A has no effect on the accuracy or utility of the calibration data. Thus, it is not necessary to add complicated reference features to either surface 15 or 25 to establish an absolute lateral point of origin for the calibration data.

Figure 3B:
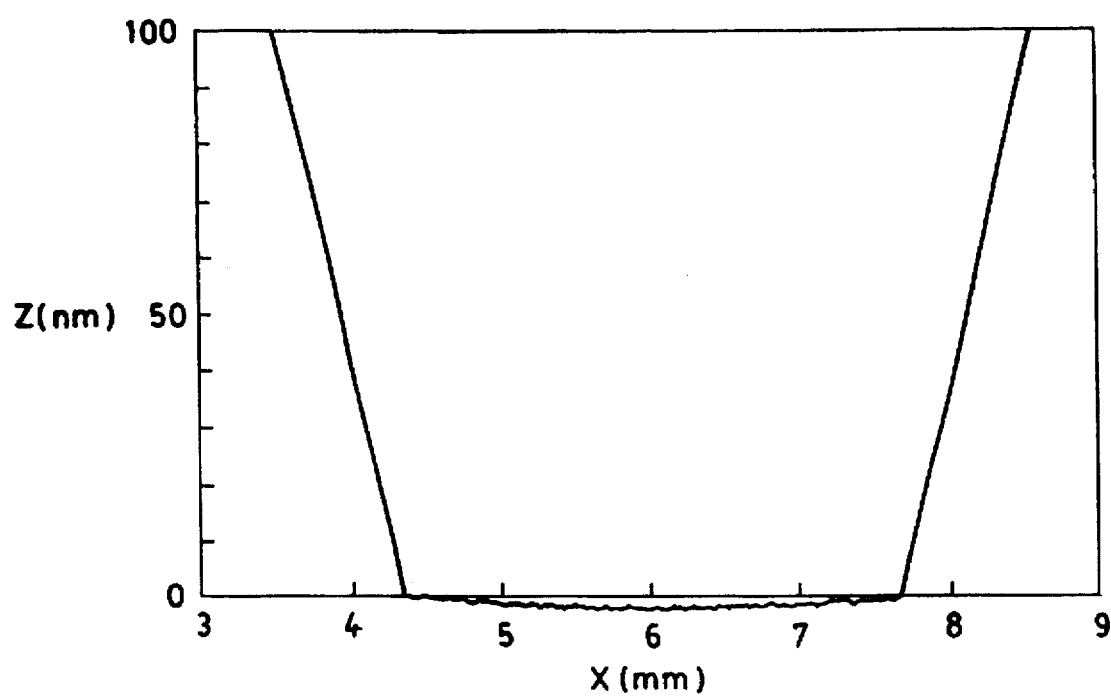
FIG. 3B is a graph showing typical calibration data in the form of gap size (ordinate or z value) as a function of lateral position (abscissa or x value), with particular emphasis on the contact region between x=4 mm and x=8 mm.

Referring now to FIG. 3B, there is shown a graph of the same data as FIG. 3A, but with a different scale to magnify the contact region. The graph in FIG. 3B shows that the presently preferred calibration standard provides detailed data for small gap sizes. The gap measurement region between 0 and 100 nm is most relevant to flying height testing. Of particular interest to flying height testing is performance at 0 nm, which for the calibration standard of the present invention is provided by a large, obvious and unambiguous contact region.

The existence of a well-defined contact region facilitates compensation for material phase change on reflection. For the presently preferred calibration standard, there is an obvious and unambiguous portion of the data curve for which the physical gap size is zero. Thus, it is readily possible to distinguish between the phase change on reflection and the phase delay introduced by a non-zero gap size.

An additional advantage of the presently preferred calibration standard is that it is readily modified to work with a variety of materials having a range of reflectivities and material properties. The simple and straightforward physical form of elements 10 and 20 means that these elements may be made of almost any solid material that can be ground and polished according to conventional optical fabrication techniques. For example, element 10 could be made of a common form of optical glass known as BK7 and element 20 could be of silicon carbide. Alternatively, element 10 could be a high-density flint glass and element 20 could be made of solid silver. As another example, element 10 could be made of fused silica and element 20 could be made of a typical slider material and coated with a thin film of another material such as diamond-like carbon.

The presently preferred calibration standard used in conjunction with an optical gap measuring tool additionally provides a method and means for determining the material phase change on reflection for a variety of materials. Referring to FIGS. 1 and 2, in a first step, optical gap measuring tool 101 is calibrated using a preferred embodiment of the presently preferred calibration standard 100 in which elements 10 and 20 have well known optical properties. In a next step, optical gap measuring tool 101 measures the gap profile of an embodiment of the presently preferred calibration standard 100 in which element 20 is a test object made of a material whose phase change on reflection is unknown. Element 20 may be any solid material ground and polished according to known optical manufacturing techniques, or alternatively a solid substrate coated with a layer of the test material. Since contact region 80 of the presently preferred calibration standard provides a clear and unambiguous zero-gap reference, any observed phase change detected within the contact region is equal to the material phase change on reflection for the test object.

Figure 4:
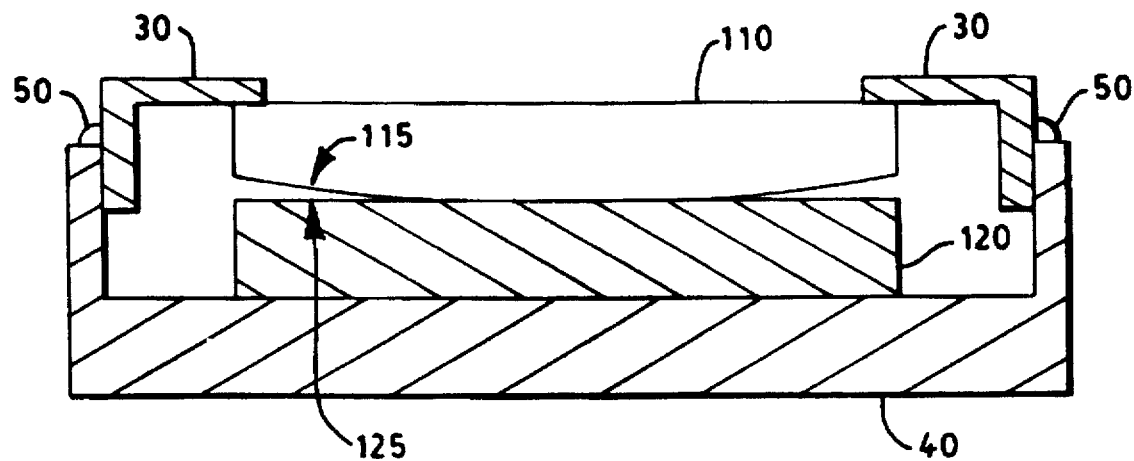
FIG. 4 is a drawing depicting a cross section of an alternative embodiment of the present invention calibration standard of FIG. 1.

Referring now to FIG. 4, there is shown an alternative embodiment of the presently preferred calibration standard in which a substantially transparent element 110, preferably having a convex spherical surface 115, is held in contact with a substantially opaque element 120, preferably having a substantially flat surface 125. The physical principle and measurement method for this embodiment are similar to the preferred embodiment shown in FIG. 1.

Figure 5:
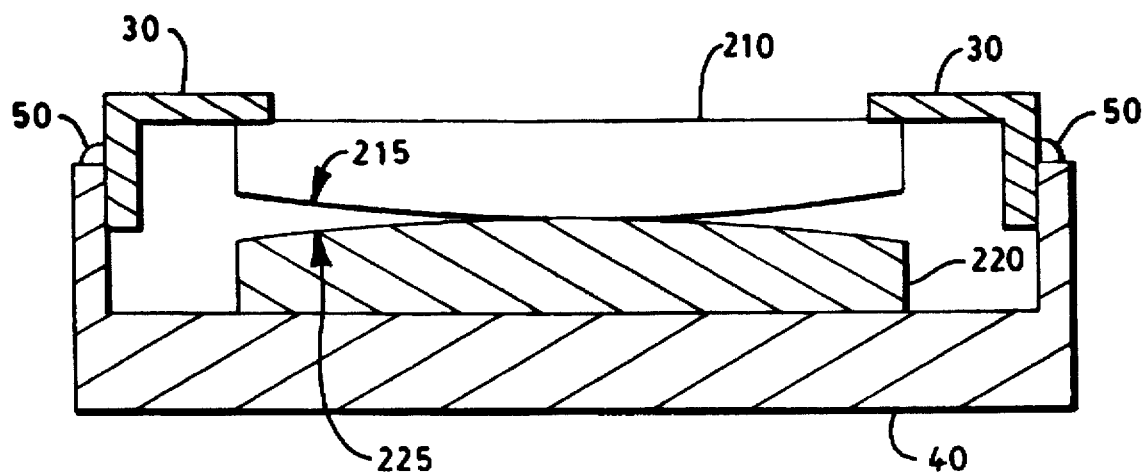
FIG. 5 is a drawing depicting a cross section of still another alternative embodiment of the present invention calibration standard of FIG. 1.
Figure 6:
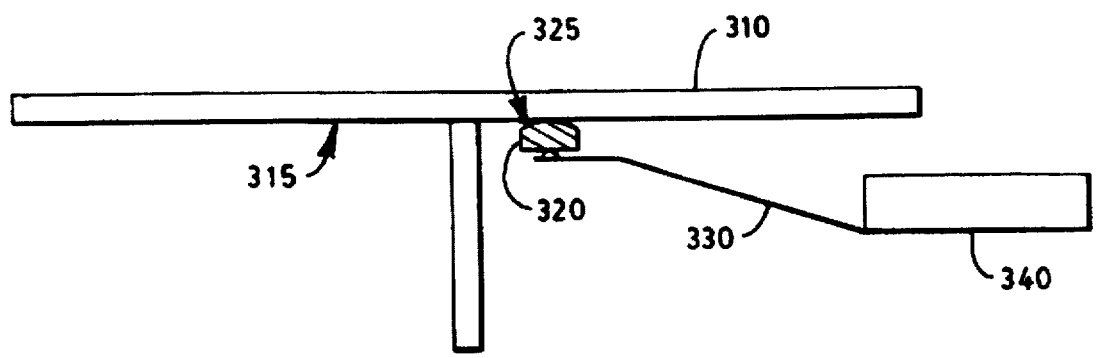
FIG. 6 is a drawing depicting another alternative embodiment of the present invention calibration standard suitable for calibrating a flying height sensor.

Referring now to FIG. 5, there is shown another alternative embodiment of the presently preferred calibration standard in which a substantially transparent element 210, preferably having a convex spherical surface 215, is held in contact with a substantially opaque element 220, preferably having a convex spherical surface 225. The physical principle and measurement method for this embodiment are also similar to the preferred embodiment shown in FIG. 1. Referring now to FIG. 6, there is shown yet another alternative embodiment of the presently preferred calibration standard specifically designed for use with optical flying height test equipment. As shown and preferred in FIG. 6, a substantially opaque element 320, preferably having a convex spherical surface 325, is held in contact with a surface 315 of a substantially transparent glass disk 310. Element 320 is held in position by a support 330 and a loading mechanism 340. The physical principle and measurement method for this embodiment are also similar to the preferred embodiment shown in FIG. 1.

Figure 7:
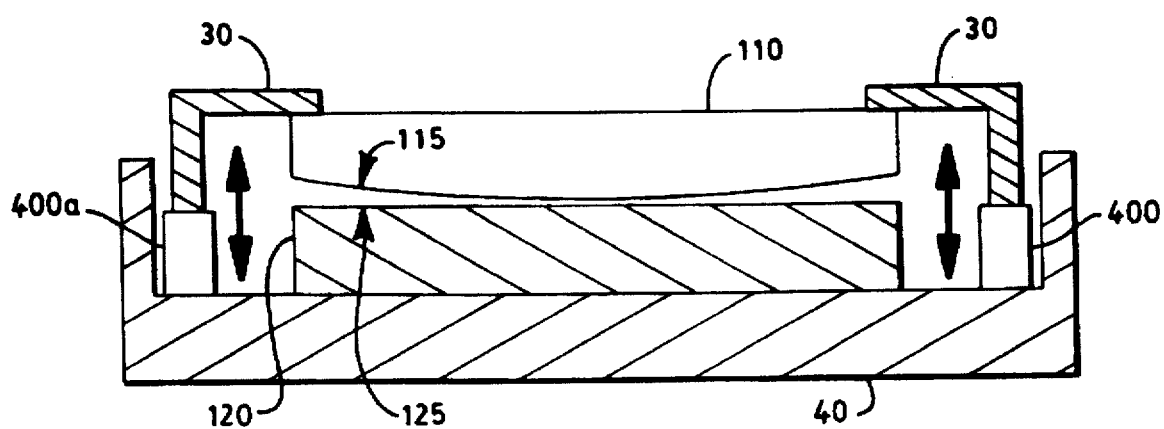
FIG. 7 is a drawing depicting yet another alternative embodiment of the present invention calibration standard in which the two principle optical elements of the device have an adjustable gap.

Referring now to FIG. 7, there is shown still another alternative embodiment of the presently preferred calibration standard in which elements 110 and 120, referred to above in relation to FIG. 3, have an adjustable gap. As shown and preferred in FIG. 7, there are two translators 400a and 400b, which may be piezo-electric crystals or like devices for effecting small (<10 µm) mechanical motion. Translators 400a and 400b are under the control of a conventional computer (not shown) and associated conventional electrical drivers (not shown). In this embodiment of the invention, the gap between elements 110 and 120 may be advantageously adjusted to gradually bring elements 110 and 120 into and out of contact, and to control the amount of mechanical pressure applied once contact is established.

By way of example, some of the advantages of the all of the various embodiments of the presently preferred method and apparatus of the present invention are: (1) accurate calibration data for many important forms of optical gap measuring tools, including in particular optical flying height sensors; (2) detailed calibration data for small gap sizes (<100 nm); (3) no need for absolute lateral position reference marks; (4) large contact region for verifying performance of zero-gap size measurement; (5) simple fabrication using common optical and mechanical manufacturing techniques; (6) no need to characterize the optical elements of the calibration standard, apart from what is commonly performed in optical fabrication to verify quality; (7) readily adapted for a wide variety of materials, including any material that can be ground and polished by common optical fabrication techniques; and (8) unambiguous distinction between zero physical gap size and material phase change on reflection effects.

Those skilled in the art will appreciate that various omissions and substitutions and changes in form or detail of the disclosed methods and apparatus may be made without departing from the spirit and scope of the present invention. For example, transparent element 10 and opaque element 20 shown in FIG. 1 could be replaced by two substantially transparent elements, provided only that both replacement elements reflect a portion of the light impinging upon their surfaces. Further, a different surface figure other than convex spherical or planar could be employed for one or both of the contacting surfaces while retaining the advantages cited herein. Those skilled in the art will also appreciate that modification of the mechanical aspects of the disclosed apparatus may be made, such as would be needed to adapt the invention to specific environmental or mechanical constraints, without substantially departing from the disclosed method of the invention.

What is claimed is:

1. In a system for calibrating an optical gap measuring tool using a calibration standard for calibrating a gap size in said optical gap measuring tool against a known gap size in said calibration standard; the improvement comprising a pair of opposed optical elements, at least one of which is fabricated from a transparent material capable of providing visible access therethrough, said opposed optical elements having opposed surfaces, at least one of said opposed surfaces of one of said pair of optical elements being curved with respect to said opposed surface of the other of said optical elements of said pair, said curved surface having a known geometric curvature and being curved away from said opposed surface of said other optical element; and means for holding said pair of optical elements together so that said curved surface of said one element is substantially in contact with the opposed surface of said other optical element of said pair for establishing an obvious and unambiguous region of contact between said opposed surfaces in which said known gap size is zero with the gap being said opposed surfaces outside said region of contact varying in accordance with said known geometric curvature of said curved surface of said one optical element, said other optical element opposed surface also comprising a curved surface oppositely curved to said one optical element curved surface.

2. A system for verifying the accuracy and sensitivity of an optical gap measuring tool, said system comprising a calibration standard and the optical gap measuring tool in combination wherein:

(1) said calibration standard comprises a first transparent optical element having a planar reference surface and a second optical element having a convex surface in contact with said planar reference surface to form between them a gap of predetermined spacing which varies from zero over a central region of contact and gets progressively larger with increasing distance away from said central region; and mounting means for facilitating the relative positioning of said calibration standard with respect to said optical gap measuring tool; and (2) said optical gap measuring tool comprises:

means for selectively directing at least one polarized beam of illumination containing p- and s-polarization states at said reference surface of said calibration standard along a common path at at least one location corresponding to a measurement spot over said predetermined gap thereof while said calibration standard and said optical gap measuring tool are in at least one relative position with respect to one another, said polarized beam of illumination being incident to said first transparent optical element at an angle and reflected from said reference surface and said convex surface as a combined return beam that emerges from said first transparent element to travel along a predetermined measurement path disposed along a predetermined angle with respect to said angle of incidence, said combined return beam containing p- and s-polarization components whose intensities and relative phase vary in accordance with the size of the gap between said reference surface and said convex surface at the spot of measurement;

means for measuring said combined return beam to determine the intensities and relative phase of its p- and s-polarization components and generate data that relates the size of said predetermined gap with the values of the measured intensities and relative phase of said p- and s-polarization components; and means for determining the complex index of refraction of said convex surface and the size of said predetermined gap between said reference and convex surfaces for at least one predetermined position between said calibration standard and optical gap measuring tool and measurement spot on said convex surface so that the measured gap values can be compared with the actual gap values to verify the accuracy and sensitivity of the optical gap measuring tool.

3. The system of claim 2 wherein said mounting means, said means for selectively directing said polarized beam, and said means for measuring said combined return beam are configured and arranged with respect to one another to generate data for more than one point over said predetermined gap while said calibration standard and said optical gap measuring tool are in any of their relative positions with respect to one another.

4. The system of claim 2 wherein said mounting means, said means for selectively directing said polarized beam, and said means for measuring said combined return beam are configured and arranged with respect to one another to generate data as said calibration standard and said optical gap measuring tool are scanned by translation relative to one another while separated by a predetermined spacing.

5. The system of claim 2 wherein said means for measuring said combined return beam comprises photodetector means and polarizing means.

6. The system of claim 2 wherein said means for determining the complex index of refraction of said convex surface and the size of said predetermined gap calculates relative phase differences in accordance with the expression $\theta(\beta)=\arg[z_s(\beta)]-\arg[z_p(\beta)]+\xi$ where $z_{s,p}(\beta)$ are the effective reflectivities of said convex surface and said reference surface taken together, and where $\xi=\arg(a_s")-\arg(a_p")$, where $a_{s,p}"$ are the electric field components of said incident polarized beam for the s and p polarizations, and where $\beta=2kh\cos(\phi)$, where k is the angular wavenumber of the source light, $\phi$ is the angle of incidence, and h is the size of said predetermined gap at a point of measurement.

7. The system of claim 2 wherein said convex surface is spherical so that said predetermined gap remains symmetrical about said central region even as said planar and convex surfaces tilt with respect to one another.

8. The system of claim 2 further including means for controllably adjusting the spacing between said planar reference and convex surfaces to change said predetermined gap between the two.

9. The system of claim 2 wherein said first transparent optical element is formed of a material selected from the group consisting of high density flint glass and fused silica and said other opposed element is formed from a material selected from the group consisting of solid silver and a magnetic slider material coated with a thin film of diamond like carbon.

10. The system of claim 2 wherein said other of said opposed elements is opaque.

11. The apparatus of claim 2 wherein said calibration standard further comprises mechanical means for maintaining said optical elements in position with respect to one another, said mechanical means being configured and arranged to protect said gap formed between said planar and convex surfaces of said optical elements from the external environment.

12. The apparatus of claim 2 wherein said angle of incidence of said polarized beam is oblique with respect to said first transparent optical element.

* * * * *